United States Patent
Zhang et al.

(10) Patent No.: US 10,172,047 B2
(45) Date of Patent: Jan. 1, 2019

(54) WIRELESS NETWORK HANDOVER METHOD, BASE STATION, AND USER EQUIPMENT

(71) Applicant: Huawei Technologies Co., Ltd., Shenzhen (CN)

(72) Inventors: Hongping Zhang, Shanghai (CN); Qinghai Zeng, Shanghai (CN); Wei Quan, Beijing (CN); Weiwei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 14/606,751

(22) Filed: Jan. 27, 2015

(65) Prior Publication Data

US 2015/0141015 A1    May 21, 2015

Related U.S. Application Data

(63) Continuation of application No. PCT/CN2013/079838, filed on Jul. 23, 2013.

(30) Foreign Application Priority Data

Jul. 27, 2012 (CN) .......................... 2012 1 0264106

(51) Int. Cl.
*H04W 36/00* (2009.01)
*H04W 76/27* (2018.01)
(Continued)

(52) U.S. Cl.
CPC ..... *H04W 36/0061* (2013.01); *H04W 36/165* (2013.01); *H04W 76/27* (2018.02); *H04W 84/12* (2013.01); *H04W 36/14* (2013.01)

(58) Field of Classification Search
CPC . H04W 26/0061; H04W 36/14; H04W 84/12; H04W 76/046; H04W 36/165; H04W 36/0061; H04W 76/27
(Continued)

(56) References Cited

U.S. PATENT DOCUMENTS

2010/0085938 A1   4/2010   Chen et al.
2011/0019641 A1   1/2011   Chang et al.
(Continued)

FOREIGN PATENT DOCUMENTS

CN    101841880 A    9/2010
CN    101848506 A    9/2010
(Continued)

*Primary Examiner* — Kamran Afshar
*Assistant Examiner* — Farid Seyedvosoghi
(74) *Attorney, Agent, or Firm* — Slater Matsil, LLP

(57) ABSTRACT

Embodiments of the present invention relates to a wireless network handover method, a base station and a user equipment. The wireless network handover method includes: sending, by a source base station, a handover request to a target base station, where the handover request includes information about a candidate wireless fidelity access point Wi-Fi AP; and sending, by the source base station, a wireless resource control RRC connection reconfiguration message to a user equipment UE, where the RRC connection reconfiguration message is used to instruct the UE to hand over from the source base station to the target base station, and the RRC connection reconfiguration message includes information that is about a target Wi-Fi AP and obtained by the target base station according to the information about the candidate Wi-Fi AP.

20 Claims, 5 Drawing Sheets

(51) Int. Cl.
*H04W 36/16* (2009.01)
*H04W 84/12* (2009.01)
*H04W 36/14* (2009.01)

(58) Field of Classification Search
USPC .................................... 455/436–444, 561
See application file for complete search history.

(56) References Cited

U.S. PATENT DOCUMENTS

| | | | |
|---|---|---|---|
| 2011/0207456 A1* | 8/2011 | Radulescu | H04W 36/0083 455/434 |
| 2011/0222523 A1* | 9/2011 | Fu | H04W 36/22 370/338 |
| 2011/0223885 A1* | 9/2011 | Salkintzis | H04W 36/0016 455/411 |
| 2011/0305293 A1* | 12/2011 | Choi | H04W 72/082 375/285 |
| 2012/0051349 A1* | 3/2012 | Teyeb | H04W 36/02 370/338 |
| 2013/0089022 A1* | 4/2013 | Lu | H04W 36/08 370/315 |
| 2013/0107812 A1 | 5/2013 | Lee et al. | |
| 2014/0376515 A1* | 12/2014 | Lei | H04W 36/0061 370/331 |

FOREIGN PATENT DOCUMENTS

| | | |
|---|---|---|
| CN | 102415016 A | 4/2012 |
| EP | 1545146 A2 | 6/2005 |
| WO | 2007029881 A2 | 3/2007 |

\* cited by examiner

100

A source base station sends a handover request to a target base station, where the handover request includes information about a candidate wireless fidelity access point Wi-Fi AP — 110

The source base station sends a radio resource control RRC connection reconfiguration message to a user equipment UE, where the RRC connection reconfiguration message is used to instruct the UE to hand over from the source base station to the target base station, and the RRC connection reconfiguration message includes information that is about a target Wi-Fi AP and obtained by the target base station according to the information about the candidate Wi-Fi AP, so that the UE accesses the target Wi-Fi AP when the UE hands over from the source base station to the target base station or after a handover is complete — 120

FIG. 1

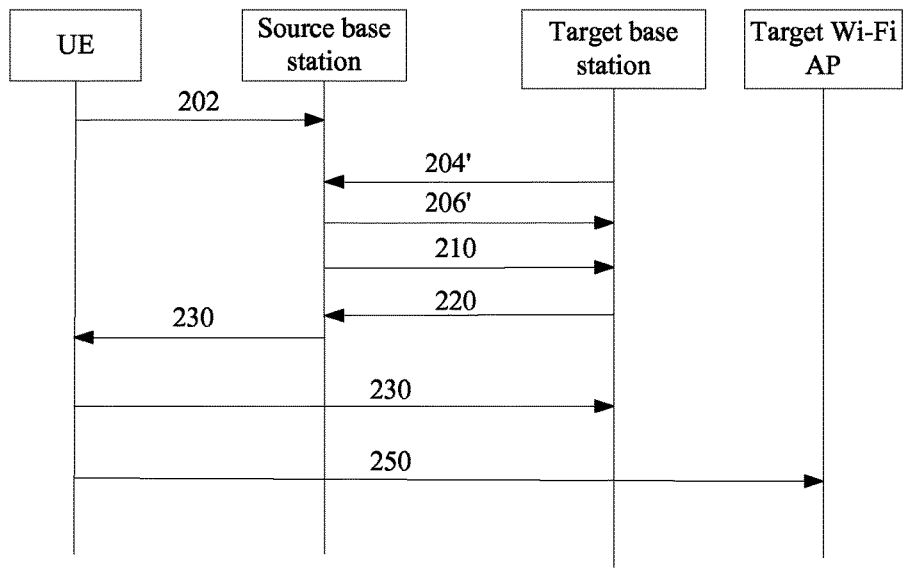

| A UE receives a wireless resource management RRC connection reconfiguration message sent by a base station, where the RRC connection reconfiguration message is used to instruct the UE to hand over from a source base station to a target base station, and the RRC connection reconfiguration message includes information that is about a target Wi-Fi AP and obtained by the target base station according to information about a candidate Wi-Fi AP | 510 |

| The UE accesses the target Wi-Fi AP at the time when the UE hands over from the source base station to the target base station or after a handover is complete | 520 |

FIG. 5

WIRELESS NETWORK HANDOVER METHOD, BASE STATION, AND USER EQUIPMENT

CROSS-REFERENCE TO RELATED APPLICATIONS

This application is a continuation of International Application No. PCT/CN2013/079838, filed on Jul. 23, 2013, which claims priority to Chinese Patent Application No. 201210264106.3, filed on Jul. 27, 2012, both of which are hereby incorporated by reference in their entireties.

TECHNICAL FIELD

Embodiments of the present invention relate to the field of wireless communications, and in particular, to a wireless network handover method, a base station, and a user equipment.

BACKGROUND

With the development of a mobile telecommunications system, the system can provide increasingly high service quality. An air interface throughput keeps increasing; however, with the increase in the number of users and the growth of data services, the air interface throughput remains a development bottleneck. To relieve congestion of a mobile network, a network operator needs to deploy more base stations to improve a network capacity, which, however, definitely increases an investment cost and a maintenance cost. To solve such a problem, more network operators choose a manner of mobile data offloading to offload a part of data in the mobile network to another available access technology, which serves as a complement of the mobile network. At present, main complementary network technologies used for mobile data offloading include a Wi-Fi (Wireless Fidelity, wireless fidelity), a home base station, and the like.

LTE (Long Term Evolution, Long Term Evolution) network is a mobile telecommunication network that is being actively researched by various manufacturers in the 3GPP (3rd Generation Partnership Program, 3rd Generation Partnership Program) organization and is an evolved network of a UMTS (Universal Mobile Telecommunications System, Universal Mobile Telecommunications System). LTE aims at providing a low-cost network capable of reducing a delay, improving a user data rate, and increasing a system capacity and coverage. An eNB (evolved NodeB, evolved NodeB) is deployed on an air interface of the LTE network, so that a UE (User Equipment, user equipment) implements air interface transmission of a mobile service by using the eNB.

Wi-Fi is a standard of a WLAN (Wireless Local Area Network, wireless local area network) and is a communications network formed by a wireless network interface card and an AP (Access Point, access point). An AP, generally called a network bridge or an access point, is a conventional bridge between a wired local area network and a wireless local area network. Therefore, any user equipment disposed with a wireless network interface card can share resources of a wired local area network and even a wide area network by using the AP. A working principle thereof is equivalent to that of a HUB with a built-in radio transmitter or a router with a built-in radio transmitter. A wireless network interface card is a client device responsible for receiving a signal transmitted by the AP.

On a communications network, when a UE moves from a base station to a coverage area of another base station, the UE needs to perform a cell handover, so as to maintain service continuity. On a network integrating LTE and Wi-Fi, when a handover is performed, transmission of a UE on a source base station and a source Wi-Fi AP stops; after the handover is complete, a target base station adds a new Wi-Fi AP for the UE; before the target base station adds a new Wi-Fi AP, the UE needs to perform detection and measurement, so that an appropriate Wi-Fi AP can be selected and configured for the UE. This consumes a long time and makes Wi-Fi data transmission interrupted for a long time.

SUMMARY

In one aspect, a technical problem to be solved in embodiments of the present invention is to shorten time of Wi-Fi transmission interruption caused by a cell handover on a network integrating LTE and Wi-Fi.

According to one respect, an embodiment of the present invention provides a wireless network handover method, where the method includes:

sending, by a source base station, a handover request to a target base station, where the handover request includes information about a candidate wireless fidelity access point Wi-Fi AP; and sending, by the source base station, a radio resource control RRC connection reconfiguration message to a user equipment UE, where the RRC connection reconfiguration message is used to instruct the UE to hand over from the source base station to the target base station, and the RRC connection reconfiguration message includes information that is about a target Wi-Fi AP and obtained by the target base station according to the information about the candidate Wi-Fi AP, so that the UE accesses the target Wi-Fi AP when the UE hands over from the source base station to the target base station or after a handover is complete.

According to another respect, an embodiment of the present invention provides a wireless network handover method, where the method includes: receiving, by a user equipment UE, a radio resource control RRC connection reconfiguration message sent by a source base station, where the RRC connection reconfiguration message is used to instruct the UE to hand over from the source base station to a target base station, and the RRC connection reconfiguration message includes information that is about a target Wi-Fi AP and obtained by the target base station according to information about a candidate wireless fidelity access point Wi-Fi AP; and accessing, by the UE, the target Wi-Fi AP at the time when the UE hands over from the source base station to the target base station or after a handover is complete.

According to another aspect, an embodiment of the present invention provides a base station, where the base station includes:

a sending unit, configured to send a handover request to a target base station, where the handover request includes information about a candidate wireless fidelity access point Wi-Fi AP; and a processing unit, configured to send a radio resource control RRC connection reconfiguration message to a user equipment UE, where the RRC connection reconfiguration message is used to instruct the UE to hand over from the base station to the target base station, and the RRC connection reconfiguration message includes information that is about a target Wi-Fi AP and obtained by the target base station according to the information about the candidate Wi-Fi AP, so that the UE accesses the target Wi-Fi AP when the UE hands over from the source base station to the target base station or after a handover is complete.

According to another aspect, an embodiment of the present invention provides a user equipment, where the user equipment includes:

a receiving unit, configured to receive a radio resource control RRC connection reconfiguration message sent by a source base station, where the RRC connection reconfiguration message is used to instruct the user equipment to hand over from the source base station to a target base station, and the RRC connection reconfiguration message includes information that is about a target Wi-Fi AP and obtained by the target base station according to information about a candidate wireless fidelity access point Wi-Fi AP; and an access unit, configured to access the target Wi-Fi AP at the time when a handover is performed from the source base station to the target base station or after a handover is complete.

According to the embodiments of the present invention, in a cell handover process, a target Wi-Fi AP is notified to a UE in advance, so that the UE may quickly access the target Wi-Fi AP in the handover process or after the handover, thereby shortening time of Wi-Fi transmission interruption caused by a cell handover.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic flowchart of a method according to an embodiment of the present invention;

FIG. 4 is a signaling interaction diagram of a specific implementation process of a method according to an embodiment of the present invention;

FIG. 5 is a schematic flowchart of a method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For example, the embodiments of the present invention are applied to the following scenario: A UE performs network communication by using a source cell or source Wi-Fi AP controlled by a source base station or both. When the UE moves to a coverage area of a target base station, a cell handover occurs, that is, the UE accesses the target base station. In a cell handover process or after a handover is complete, the UE disconnects association with the source cell or source Wi-Fi AP or both, and accesses a target Wi-Fi AP. Preferably, the target Wi-Fi AP herein is a Wi-Fi AP controlled by the target base station.

FIG. 1 is a schematic flowchart of a wireless network handover method according to an embodiment of the present invention. As shown in FIG. 1, a method 100 includes the following:

110: A source base station sends a handover request to a target base station, where the handover request includes information about a candidate wireless fidelity access point Wi-Fi AP; and 120: The source base station sends a radio resource control RRC connection reconfiguration message to a user equipment UE, where the RRC connection reconfiguration message is used to instruct the UE to hand over from the source base station to the target base station, and the RRC connection reconfiguration message includes information that is about a target Wi-Fi AP and obtained by the target base station according to the information about the candidate Wi-Fi AP, so that the UE accesses the target Wi-Fi AP when the UE hands over from the source base station to the target base station or after a handover is complete.

Figure 2:
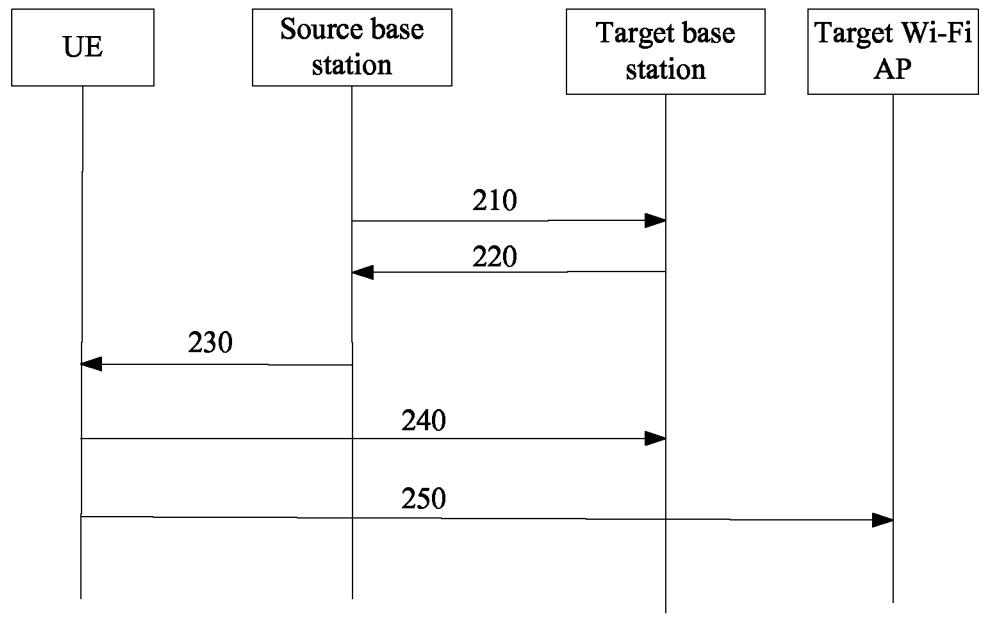
FIG. 2 is a signaling interaction diagram of a specific implementation process of a method according to an embodiment of the present invention.

The following further describes the method in the embodiment of the present invention with reference to a specific application scenario. FIG. 2 is a schematic diagram of signaling interaction in a cell handover process according to an embodiment of the present invention. As shown in FIG. 2, when a UE moves to a coverage area of a target base station, in step 210, a source base station sends a handover request to the target base station, where the handover request includes the information about the candidate Wi-Fi AP. The candidate Wi-Fi AP described herein may be selected as the foregoing target Wi-Fi AP by the target base station. The candidate Wi-Fi AP is determined according to a process described below in detail in the specification, or may also be manually configured on the source base station by a configuration console of the source base station. In addition, according to the embodiment of the present invention, the Wi-Fi AP information, for example, may include an SSID (Service Set Identifier, service set identifier) of the Wi-Fi AP or a MAC (Media Access Control, media access control) address.

Then, in step 220, the source base station receives a handover response that is for the handover request and returned by the target base station, where the handover response includes the information that is about the target Wi-Fi AP and selected by the target base station from the information about the candidate Wi-Fi AP, or the information that is about the target Wi-Fi AP and additionally selected by the target base station according to a configuration policy of the target base station. For example, the target base station determines the target Wi-Fi AP according to load and a coverage area of a candidate Wi-Fi AP, for example, selects a light-load Wi-Fi AP as the target Wi-Fi AP from candidate Wi-Fi APs. For another example, the target base station learns, from an OAM (Operator And Maintenance, operator and maintenance), that a certain Wi-Fi AP almost covers a target cell, and still determines the Wi-Fi AP as the target Wi-Fi AP even though the Wi-Fi AP is not in a candidate Wi-Fi AP list.

Then, in step 230, the source base station sends an RRC connection reconfiguration message to the UE, where the RRC connection reconfiguration message instructs the UE to hand over from the source base station to the target base station, and the RRC connection reconfiguration message includes the information that is about the target Wi-Fi AP and obtained by the target base station according to the information about the candidate Wi-Fi AP, so that the UE accesses the target Wi-Fi AP when the UE hands over from the source base station to the target base station or after a handover is complete.

Then, in step 240, the UE initiates a RACH (Random Access Channel, random access channel) process to the target base station and accesses the target base station.

When step 240 is being implemented or after step 240 is complete, the UE, in step 250, initiates an association process to the target Wi-Fi AP and accesses the target Wi-Fi AP.

To select a target Wi-Fi AP, in addition to that a target Wi-Fi AP is manually configured by using a configuration console of the source base station, the source base station obtains the candidate Wi-Fi AP, for example, by using the following method.

Figure 3:
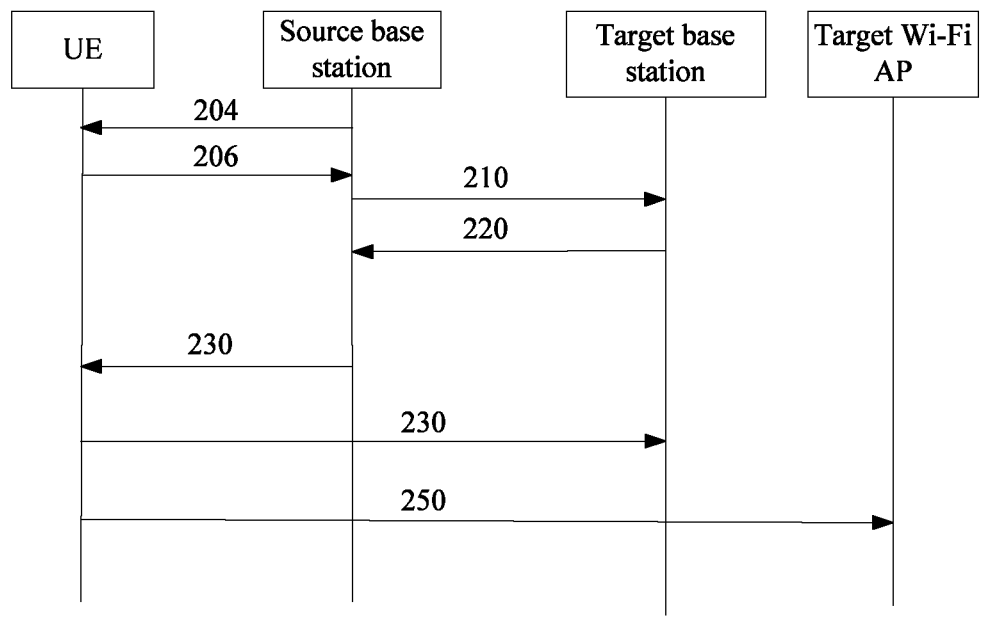
FIG. 3 is a signaling interaction diagram of a specific implementation process of a method according to an embodiment of the present invention.

For example, as shown in FIG. 3, before step 210, the source base station, in step 204, sends a measurement task to the UE, so as to instruct the UE to report detected information about a Wi-Fi AP.

Then, in step 206, the source base station receives a measurement report sent by the UE, where the measurement report carries the information that is about the Wi-Fi AP and obtained through a measurement performed by the UE, and the candidate Wi-Fi AP is selected from Wi-Fi APs measured by the UE, for example, selecting one or more Wi-Fi APs with the strongest signal or best signal quality as the candidate Wi-Fi AP.

The measurement task herein is, for example, an A3 measurement task, which may carry an instruction information element and is used to instruct the UE to report the detected information that is about the Wi-Fi AP and in the measurement report when the measurement report is triggered by the measurement task; or the measurement report may carry a preset measurement event, for example, a new measurement event, such as a B3 event, where the measurement event is used to instruct the UE to perform detection and report the detected information about the Wi-Fi AP.

According to the embodiment of the present invention, the measurement event may include a preset threshold, and the measurement event is used to instruct the UE to perform detection and report information about a Wi-Fi AP with signal quality higher than the preset threshold.

According to the embodiment of the present invention, the source base station and the target base station may exchange in advance, information about a Wi-Fi AP each controlled, so that the source base station can learn a Wi-Fi AP controlled by the target base station when a cell handover is performed, and the target Wi-Fi AP in a handover request message sent by the source base station to the target base station is the Wi-Fi AP controlled by the target base station, thereby avoiding sending unnecessary information to the target base station. Alternatively, after learning Wi-Fi AP information of a neighboring base station, the base station may control the UE to report only a detected Wi-Fi AP (or a Wi-Fi AP with enough good signal quality) under a particular base station (a potential target base station for handover).

For example, as shown in FIG. 4, before step 210, the source base station, in step 204, receives an X2 establishment request sent by the target base station, where the X2 establishment request includes information about a Wi-Fi AP controlled by the target base station and is used to select the candidate Wi-Fi AP by the source base station from the Wi-Fi AP controlled by the target base station, for example, selecting one or more Wi-Fi APs with the strongest signal or best signal quality as the candidate Wi-Fi AP.

According to the embodiment of the present invention, in step 206, the source base station sends an X2 establishment response to the target base station, where the X2 establishment response includes information about the Wi-Fi AP controlled by the source base station.

According to the embodiment of the present invention, to speed up a process of accessing the target Wi-Fi AP by the UE, the handover request message sent by the source base station to the target base station carries a MAC address of the UE. The MAC address of the UE is used for Wi-Fi communication herein. Therefore, before step 210, the source base station obtains the MAC address of the UE in step 202. Because the handover request message carries the MAC address of the UE, when the UE accesses the target Wi-Fi AP, the target Wi-Fi AP (or the target base station) can immediately identify an identity of the UE, thereby allowing access of the UE, which speeds up an access progress and improves an access success rate.

The source base station obtains the MAC address of the UE by using many methods. For example, according to the embodiment of the present invention, the source base station may send a request message to the UE, where the request message is used to instruct the UE to report the MAC address of the UE, and then the source base station receives a response message sent by the UE, where the response message includes the MAC address of the UE; or the source base station sends a request message to a core network, where the request message instructs the core network to return the MAC address of the UE, and then the source base station receives a response message sent by the core network, where the response message carries the MAC address of the UE; or the UE proactively reports the MAC address of the UE to the source base station, for example, when accessing the source base station, the UE proactively reports the MAC address of the UE to the source base station, for example, the MAC address of the UE is sent by using an RRC connection establishment complete message, or be carried in an access capability of the UE and reported to the source base station.

When the UE dissociates with a source Wi-Fi AP, the source Wi-Fi AP may send an SN STATUS TRANSFER (sequence number status transfer) message to a connected source base station, and notify a PDCP SN (Packet Data Convergence Protocol Serial Number, packet data convergence protocol serial number) of a currently received/sent data packet, so as to ensure that data packet loss is avoided in a handover process; meanwhile, the source base station further receives a downlink data packet that is sent by the source Wi-Fi AP and is not confirmed. It should be noted that the foregoing process may be applied to all scenarios where a UE dissociates with an associated WiFi AP.

The foregoing describes, from a perspective of the source base station, a specific implementation process of a method in the embodiment of the present invention. The following further describes the method in the embodiment of the present invention from a perspective of the UE in detail.

FIG. 5 is a schematic flowchart of a wireless network handover method according to an embodiment of the present invention. As shown in FIG. 5, a method 500 includes:

510: A UE receives a wireless resource management RRC connection reconfiguration message sent by a base station, where the RRC connection reconfiguration message is used to instruct the UE to hand over from a source base station to a target base station, and the RRC connection reconfiguration message includes information that is about a target Wi-Fi AP and obtained by the target base station according to information about a candidate Wi-Fi AP.

520: The UE accesses the target Wi-Fi AP at the time when the UE hands over from the source base station to the target base station or after a handover is complete.

As described above, according to the embodiment of the present invention, before the receiving an RRC connection reconfiguration message sent by a base station, the method 500 further includes:

receiving a measurement task sent by the source base station, where the measurement task is used to instruct the UE to report detected information about a Wi-Fi AP to the source base station, and the information about the candidate Wi-Fi AP includes the information, detected by the UE, about the Wi-Fi AP.

As described above, according to the embodiment of the present invention, the measurement task includes an instruction information element or a measurement event and is used to instruct the UE to report the detected information about the Wi-Fi AP.

As described above, according to the embodiment of the present invention, the target Wi-Fi AP is a Wi-Fi AP controlled by the target base station.

As described above, according to the embodiment of the present invention, the measurement task carries a preset measurement event, where the measurement event includes a preset threshold, and the measurement event is used to instruct the UE to perform detection and report information about a Wi-Fi AP with signal quality higher than the preset threshold.

As described above, according to the embodiment of the present invention, before the receiving, by the UE, an RRC connection reconfiguration message sent by a base station, the method 500 further includes:

receiving, by the UE, a request message sent by the source base station, where the request message is used to instruct the UE to report a MAC address of the UE; and sending, by the UE, a response message to the source base station, where the response message carries the MAC address of the UE.

As described above, according to the embodiment of the present invention, before the receiving, by the UE, an RRC connection reconfiguration message sent by a source base station, the method 500 further includes:

reporting, by the UE, the MAC address of the UE to the source base station.

As described above, according to the embodiment of the present invention, the information about the Wi-Fi AP includes an SSID of the Wi-Fi AP or a MAC address of the Wi-Fi AP or both.

According to the embodiment of the present invention, in a cell handover process, a target Wi-Fi AP is notified to a UE in advance, so that the UE may quickly access the target Wi-Fi AP in the handover process or after the handover, thereby shortening time of Wi-Fi transmission interruption caused by a cell handover, and rapidly recovering high-speed data transmission performed by the UE through a Wi-Fi network. This enhances the communication efficiency and improves user experience.

Embodiments of the present invention further provide a base station and a user equipment for implementing the method in the embodiment of the present invention.

Figure 6:
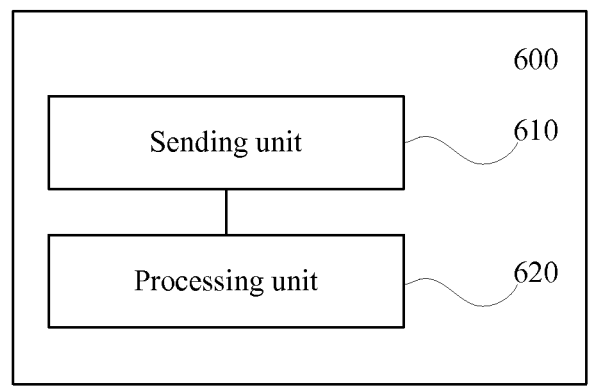
FIG. 6 is a schematic structural diagram of a base station according to an embodiment of the present invention.

FIG. 6 is a schematic structural diagram of a base station according to an embodiment of the present invention. The base station shown in FIG. 6 may be used as a source base station in the method of the embodiment of the present invention. As shown in FIG. 6, a base station 600 includes:

a sending unit 610, configured to send a handover request to a target base station, where the handover request includes information about a candidate wireless fidelity access point Wi-Fi AP; and a processing unit 620, configured to send a radio resource control RRC connection reconfiguration message to a user equipment UE, where the RRC connection reconfiguration message is used to instruct the UE to hand over from the base station to the target base station, and the RRC connection reconfiguration message includes information that is about a target Wi-Fi AP and obtained by the target base station according to the information about the candidate Wi-Fi AP, so that the UE accesses the target Wi-Fi AP when the UE hands over from the source base station to the target base station or after a handover is complete.

Figure 7:
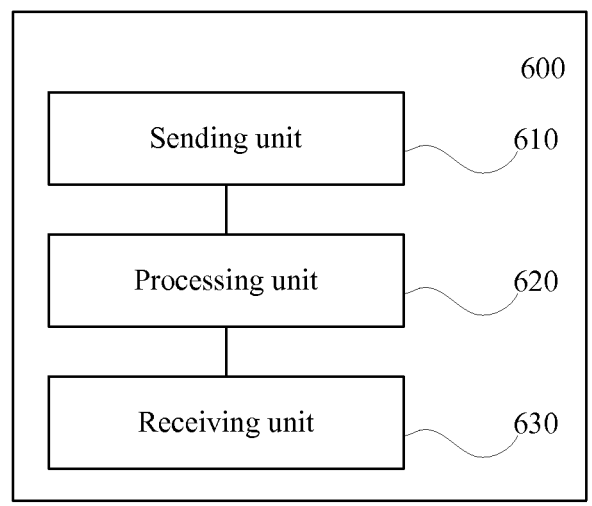
FIG. 7 is a schematic structural diagram of a base station in a further implementation solution according to an embodiment of the present invention.

According to the embodiment of the present invention, as shown in FIG. 7, the base station 600 further includes:

a receiving unit 630, configured to receive a handover response sent by the target base station, where the handover response includes the information that is about the target Wi-Fi AP and selected by the target base station from the information about the candidate Wi-Fi AP, or the information that is about the target Wi-Fi AP and determined by the target base station according to the information about the candidate Wi-Fi AP.

According to the embodiment of the present invention, before the sending a handover request to the target base station, the sending unit 610 is further configured to send a measurement task to the UE, where the measurement task is used to instruct the UE to report detected information about a Wi-Fi AP, and the information about the candidate Wi-Fi AP includes the information, detected by the UE, about the Wi-Fi AP.

The receiving unit 630 is further configured to receive a measurement report sent by the UE, where the measurement report carries the information that is about the Wi-Fi AP and obtained through a measurement performed by the UE, and the candidate Wi-Fi AP is selected from Wi-Fi APs measured by the UE.

According to the embodiment of the present invention, before the sending a handover request to the target base station, the receiving unit 630 is further configured to receive an X2 establishment request sent by the target base station, where the X2 establishment request includes information about a Wi-Fi AP controlled by the target base station and is used to select the candidate Wi-Fi AP by the base station from the Wi-Fi AP controlled by the target base station.

According to the embodiment of the present invention, the sending unit 610 is further configured to send an X2 establishment response to the target base station, where the X2 establishment response carries information about a Wi-Fi AP controlled by the source base station.

According to the embodiment of the present invention, the measurement task carries a preset measurement event, where the measurement event includes a preset threshold, and the measurement event is used to instruct the UE to perform detection and report information about a Wi-Fi AP with signal quality higher than the preset threshold.

According to the embodiment of the present invention, the receiving unit 630 is further configured to receive a sequence number status transfer message sent by a source Wi-Fi AP that is controlled by the source base station, where the sequence number status transfer message is used to notify the source base station of a packet data convergence protocol serial number of a currently received/sent data packet, and the receiving unit 630 is further configured to receive a downlink data packet that is sent by the source Wi-Fi AP and is not confirmed.

According to the embodiment of the present invention, the sending unit 610 is further configured to send a request message to the UE, where the request message is used to instruct the UE to report a MAC address of the UE; and the receiving unit 630 is further configured to receive a response message sent by the UE, where the response message carries the MAC address of the UE, and the handover request message sent to the target base station carries the MAC address of the UE.

According to the embodiment of the present invention, the sending unit 610 is further configured to send the request message to a core network, where the request message instructs the core network to return the MAC address of the UE; and the receiving unit 630 is further configured to receive a response message sent by the core network, where the response message carries the MAC address of the UE, and the handover request message sent to the target base station carries the MAC address of the UE.

According to the embodiment of the present invention, the receiving unit 630 is further configured to receive the MAC address reported by the UE.

According to the embodiment of the present invention, the information about the Wi-Fi AP includes an SSID of the Wi-Fi AP or a MAC address of the Wi-Fi AP or both.

Figure 8:
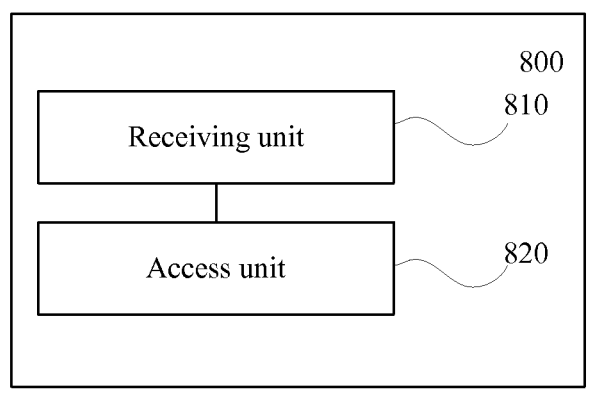
FIG. 8 is a schematic structural diagram of a user equipment according to an embodiment of the present invention.

FIG. 8 is a schematic structural diagram of a user equipment according to an embodiment of the present invention. As shown in FIG. 8, a user equipment 800 includes:

a receiving unit 810, configured to receive a radio resource control RRC connection reconfiguration message sent by a source base station, where the RRC connection reconfiguration message is used to instruct the user equipment to hand over from the source base station to a target base station, and the RRC connection reconfiguration message includes information that is about a target Wi-Fi AP and obtained by the target base station according to information about a candidate wireless fidelity access point Wi-Fi AP; and an access unit 820, configured to access the target Wi-Fi AP at the time when a handover is performed from the source base station to the target base station or after a handover is complete.

According to the embodiment of the present invention, before the receiving an RRC connection reconfiguration message sent by a source base station, the receiving unit 810 is further configured to receive a measurement task sent by the source base station, where the measurement task is used to instruct the UE to report detected information about a Wi-Fi AP, and the information about the candidate Wi-Fi AP includes the Wi-Fi AP information detected by the UE.

According to the embodiment of the present invention, the received measurement task sent by the source base station carries an instruction information element or a measurement event and is used to instruct the UE to report the detected information about the Wi-Fi AP.

According to the embodiment of the present invention, the target Wi-Fi AP is a Wi-Fi AP controlled by the target base station.

According to the embodiment of the present invention, the measurement task carries a preset measurement event, where the measurement event includes a preset threshold, and the measurement event is used to instruct the UE to perform detection and report information about a Wi-Fi AP with signal quality higher than the preset threshold.

According to the embodiment of the present invention, before the receiving an RRC connection reconfiguration message sent by a source base station, the receiving unit 810 is further configured to receive a request message sent by the source base station, where the request message is used to instruct the UE to report a MAC address of the UE.

According to the embodiment of the present invention, the information about the Wi-Fi AP includes an SSID of the Wi-Fi AP or a MAC address of the Wi-Fi AP or both.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A wireless network handover method, wherein the method comprises:
    sending, by a source base station, a handover request to a target base station for a handover of a user equipment (UE) from the source base station to the target base station, wherein the handover request comprises information about a list of candidate wireless fidelity access points (Wi-Fi APs) of the target base station, the handover request triggering the target base station to select, from the list of candidate Wi-Fi APs based on a configuration policy of the target base station, a target Wi-Fi AP of the target base station for the UE to access during or after the handover of the UE, and wherein the list of candidate Wi-Fi APs is determined by the source base station based on measurements performed by the UE on a plurality of Wi-Fi APs of the target base station;
    sending, by the source base station, a radio resource control (RRC) connection reconfiguration message to the UE, wherein the RRC connection reconfiguration message is used to instruct the UE to hand over from the source base station to the target base station, and the RRC connection reconfiguration message comprises information about the target Wi-Fi AP of the target base station for the UE to access the target Wi-Fi AP when the UE hands over from the source base station to the target base station or after the handover of the UE is complete;
    receiving, by the source base station during the handover of the UE, a sequence number status transfer message sent by a source Wi-Fi AP that is controlled by the source base station, wherein the sequence number status transfer message is used to notify the source base station of a packet data convergence protocol serial number of a currently received/sent data packet of the source Wi-Fi AP; and
    receiving, by the source base station, a downlink data packet that is sent by the source Wi-Fi AP and is not confirmed.

2. The method of claim 1, further comprising:
    receiving, by the source base station from the target base station, information about the target Wi-Fi AP of the target base station, wherein the target Wi-Fi AP is selected by the target base station according to at least in part the information about the list of candidate Wi-Fi APs of the target base station transmitted in the handover request and the configuration policy of the target base station.

3. The method of claim 2, wherein receiving the information about the target Wi-Fi AP of the target base station comprises:
    receiving, by the source base station, a handover response sent by the target base station, wherein the handover response comprise the information about the target Wi-Fi AP of the target base station.

4. The method of claim 1, further comprising:
    receiving, by the source base station, an X2 establishment request sent by the target base station, the X2 establishment request comprising information about one or more Wi-Fi APs controlled by the target base station, wherein the source base station selects the list of candidate Wi-Fi APs from the one or more Wi-Fi APs controlled by the target base station.

5. The method of claim 1, further comprising:
    receiving, by the source base station, measurement reports from UEs about the plurality of Wi-Fi APs of the target base station.

6. The method of claim 5, further comprising:
    sending, by the source base station to the UE, a measurement task, the measurement task instructing the UE to report information about one or more Wi-Fi APs of the target base station.

7. The method of claim 1, further comprising:
    obtaining, by the source base station, a media access control (MAC) address of the UE, wherein the handover request comprises the MAC address of the UE.

8. The method of claim 1, wherein the target Wi-Fi AP is controlled by the target base station.

9. A base station, comprising:
    a processor; and
    a non-transitory computer-readable storage medium storing a program to be executed by the processor, the program including instructions to:
    send a handover request to a target base station for a handover of a user equipment (UE) from the base station to the target base station, wherein the handover request comprises information about a list of candidate wireless fidelity access points (Wi-Fi APs) of the target base station, the handover request triggering the target base station to select, from the list of candidate Wi-Fi APs based on a configuration policy of the target base station, a target Wi-Fi AP of the target base station for the UE to access during or after the handover of the UE, and wherein the list of candidate Wi-Fi APs is determined by the base station based on measurements performed by the UE on a plurality of Wi-Fi APs of the target base station;
    send a radio resource control (RRC) connection reconfiguration message to the UE, wherein the RRC connection reconfiguration message is used to instruct the UE to hand over from the base station to the target base station, and the RRC connection reconfiguration message comprises information about the target Wi-Fi AP of the target base station for the UE to access the target Wi-Fi AP when the UE hands over from the base station to the target base station or after the handover of the UE is complete;
    receive, during the handover of the UE, a sequence number status transfer message sent by a source Wi-Fi AP that is controlled by the base station, wherein the sequence number status transfer message is used to notify the base station of a packet data convergence protocol serial number of a currently received or currently sent data packet of the source Wi-Fi AP; and receive a downlink data packet that is sent by the source Wi-Fi AP and is not confirmed.

10. The base station of claim 9, wherein the program further includes instructions to:
receive, from the target base station, information about the target Wi-Fi AP of the target base station.

11. The base station of claim 10, wherein the information about the target Wi-Fi AP of the target base station is received in a handover response sent by the target base station.

12. The base station of claim 9, wherein the program further includes instructions to:
receive an X2 establishment request sent by the target base station, the X2 establishment request comprising information about one or more Wi-Fi APs controlled by the target base station, wherein the base station selects the list of candidate Wi-Fi APs from the one or more Wi-Fi APs controlled by the target base station.

13. The base station of claim 9, wherein the program further includes instructions to:
receive measurement reports from UEs on one or more Wi-Fi APs of the target base station.

14. The base station of claim 13, wherein the program further includes instructions to:
send, to the UE, a measurement task, the measurement task instructing the UE to report information about one or more Wi-Fi APs of the target base station.

15. The base station of claim 9, wherein the program further includes instructions to:
obtain a media access control (MAC) address of the UE, wherein the handover request comprises the MAC address of the UE.

16. The base station of claim 9, wherein the target Wi-Fi AP is controlled by the target base station.

17. A method, comprising:
sending, by a source base station, a handover request to a target base station requesting handover of a user equipment (UE) from the source base station to the target base station, wherein the handover request comprises information of a list of candidate wireless fidelity access points (Wi-Fi APs) of the target base station, wherein the handover request triggers the target base station to select, from the list of candidate Wi-Fi APs based on a configuration policy of the target base station, a target Wi-Fi AP of the target base station for the UE to access during or after the handover of the UE, and wherein the list of candidate Wi-Fi APs is determined by the source base station based on measurements performed by the UE on a plurality of Wi-Fi APs of the target base station;

receiving, by the source base station from the target base station, information of the target Wi-Fi AP of the target base station; and sending, by the source base station to the UE, the information of the target Wi-Fi AP so that the UE obtains the information of the target Wi-Fi AP before the UE is handed over to the target base station, and accesses the target Wi-Fi AP when the UE hands over from the source base station to the target base station or after a handover is complete.

18. The method of claim 17, further comprising:
selecting, by the source base station, the list of candidate Wi-Fi APs from the plurality of Wi-Fi APs controlled by the target base station.

19. The method of claim 17, further comprising:
receiving, by the source base station, measurement reports provided by UEs on the plurality of Wi-Fi APs of the target base station.

20. The method of claim 17, wherein sending, by the source base station to the UE, the information of the target Wi-Fi AP comprises:
sending, by the source base station, a radio resource control (RRC) connection reconfiguration message to the UE, the RRC connection reconfiguration message comprising the information of the target Wi-Fi AP.

* * * * *